United States Patent

Ellerich et al.

(10) Patent No.: US 6,595,588 B2
(45) Date of Patent: Jul. 22, 2003

(54) VEHICLE SEAT HAVING A FOLDED POSITION

(75) Inventors: Frank Ellerich, Bennhausen (DE); Joachim Kämmerer, Kaiserslautern (DE); Ralph Kuschmann, Gusterath (DE); Holger Kunz, Otterberg (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/097,550

(22) Filed: Mar. 11, 2002

(65) Prior Publication Data

US 2002/0130542 A1 Sep. 19, 2002

Related U.S. Application Data (63) Continuation of application No. PCT/EP00/07660, filed on Aug. 8, 2000.

(30) Foreign Application Priority Data

Sep. 11, 1999 (DE) .......................................... 199 43 454

(51) Int. Cl.[7] .................................................. A47C 1/02
(52) U.S. Cl. .................... 297/331; 297/344.1; 297/336; 296/68.1; 296/65.1
(58) Field of Search ................................ 297/336, 335, 297/331, 334, 344.1, 332, 333; 296/68.1

(56) References Cited

U.S. PATENT DOCUMENTS

| 4,736,985 A | 4/1988 | Fourrey et al. |
| 5,158,338 A | 10/1992 | Hayakawa et al. |
| 5,195,795 A | 3/1993 | Cannera et al. |
| 5,449,214 A | * 9/1995 | Totani ........................ 296/68.1 |
| 5,482,349 A | 1/1996 | Richter et al. |
| 5,588,707 A | * 12/1996 | Bolsworth et al. ............ 296/66 |
| 5,611,589 A | * 3/1997 | Fujii et al. ............... 296/65.09 |
| 6,079,763 A | 6/2000 | Clemente |
| 6,082,805 A | * 7/2000 | Gray et al. ............... 296/65.09 |

FOREIGN PATENT DOCUMENTS

| DE | 44 39 975 A1 | 5/1996 |
| DE | 195 33 932 A1 | 3/1997 |
| DE | 196 07 060 C1 | 4/1997 |
| EP | 0 364 146 A2 | 4/1990 |
| EP | 0 622 268 A1 | 11/1994 |
| FR | 2 589 800 A1 | 5/1987 |
| GB | 2068216 A | 8/1981 |
| GB | 2 095 984 A | 10/1982 |
| GB | 87 16 848.0 U1 | 3/1988 |
| JP | 55 164532 A | 3/1981 |

* cited by examiner

Primary Examiner—Peter M. Cuomo
Assistant Examiner—Erika Garrett
(74) Attorney, Agent, or Firm—Alston & Bird LLP (57) ABSTRACT

In a vehicle seat (1), in particular a motor-vehicle rear-seat bench, which takes up at least one seat position and at least one non-use or folded position in order to enlarge the loading area, having an articulated seat frame (3, 5, 7, 9), which has a cushion carrier (21) provided with a seat cushion (22), and having a backrest (27), which is coupled to the seat frame (3, 5, 7, 9) and has a backrest cushion (30), in which, during the transformation from the seat position into the non-use or folded position, the seat frame (3, 5, 7, 9) moves onto itself, and the backrest (27) and the cushion carrier (21) move relative to each other, the moving of a single part (5) of the vehicle seat (1) causes both a movement of the seat frame (3, 5, 7, 9) and a relative movement of the backrest (27) and the cushion carrier (21).

21 Claims, 13 Drawing Sheets

VEHICLE SEAT HAVING A FOLDED POSITION

CROSS REFERENCE TO RELATED APPLICATION

This is a continuation of International Application No. PCT/EP00/7660, filed Aug. 8, 2000, and designating the U.S., and International Application No. PCT/EP00/7660 is incorporated herein by reference.

BACKGROUND OF THE INVENTION

The present invention relates to a vehicle seat, in particular a motor-vehicle rear-seat bench.

A known vehicle seat of this type is used in particular in what is referred to as a "van" so as to be able to undertake variable structuring of the interior. In order to enlarge the storage space behind the vehicle seat, the user can transform the vehicle seat from the seat position into the non-use or folded position in which the vehicle seat takes up as little space as possible. For the transfer into the folded position, a number of maneuvers are used in order to fold together various parts of the vehicle seat and to fold them upward. If appropriate, the vehicle seat may furthermore be unlatched from bolts forming part of the vehicle structure or may be slid out of a runner, in order to be removed completely from the motor vehicle.

SUMMARY OF THE INVENTION

An aspect of the present invention is the provision of improvements to a vehicle seat of the type mentioned above.

In accordance with one aspect of the present invention, a vehicle seat is provided that can be transformed in order to enlarge an area that is for being loaded, and this vehicle seat includes an articulated seat frame and a backrest. The backrest includes a backrest cushion, and the articulated seat frame includes a cushion carrier which is carrying a seat cushion. The backrest is coupled to the seat frame in a manner so that the vehicle seat can be transformed from at least one seat position to at least one folded position. There is relative movement between parts of the seat frame while the vehicle seat is transformed from the seat position to the folded position. Likewise, there is relative movement between the backrest and the cushion carrier while the vehicle seat is transformed from the seat position to the folded position. In addition, moving of a single part of the vehicle seat causes both movement of the seat frame and relative movement between the backrest and the cushion carrier.

By means of a suitable kinematic arrangement, the vehicle seat according to the present invention can be brought into the folded position by the user undertaking just one or more maneuvers, which considerably facilitates the operation. In comparison to structures which are able to be transferred into the folded position only by means of a number of maneuvers, the risk of the vehicle seat being damaged by misoperation is reduced.

By virtue of the fact that the moving of a single part of the vehicle seat causes both a movement of the seat frame and a relative movement of the backrest and backrest carrier, a single maneuver suffices in order to be able to carry out the transformation into the folded position (and vice versa).

In a preferred embodiment, the seat frame has a first four-bar linkage and the backrest is coupled to the seat frame by means of a second four-bar linkage. The part which causes the movement of the seat frame and the relative movement of the backrest and the cushion carrier, for example the rear foot, preferably forms part of both four-bar linkages. Pivoting of this part causes the entire vehicle seat to move, depending on the pivoting direction, into the folded position or into the seat position. The movement can be supported by a gas-filled compression spring. The backrest is displaced forward, retaining its inclination, preferably by the interaction of the two four-bar linkages, with the result that in the folded position the backrest bears, with its side facing away from the backrest cushion, against the seat cushion.

Simplified operation using two maneuvers can also be achieved if the transformation from the seat position into the non-use or folded position takes place using a height adjuster and/or a longitudinal adjuster. A space-saving arrangement of the vehicle seat in the folded position is also produced if, during the transformation from the seat position into the folded position, the cushion carrier is folded upward to the backrest.

The supporting of the cushion carrier at the front by means of a front foot has the advantage of better absorption of the "submarining forces" than if it were supported on a centrally arranged rod. In the case of a head-on crash, this prevents relatively great deformation of the cushion carrier and therefore prevents the upper part of the user's body from slipping under the seat belt. Severe internal injuries are therefore prevented. Better dissipation of the backrest forces, in particular in the case of a rear-end crash, is possible by means of a link, which runs obliquely forward, in the seat frame. The forces are transmitted from the backrest via a backrest carrier to the rear foot and via the link to the front foot. By this means, the forces are introduced more uniformly into the floor assembly of the vehicle structure rendering complicated reinforcements in the floor assembly superfluous.

BRIEF DESCRIPTION OF THE DRAWINGS

In the following, the invention is explained in greater detail with reference to four exemplary embodiments illustrated in the drawings, in which.

DETAILED DESCRIPTION OF THE INVENTION

In a first exemplary embodiment illustrated in FIGS. 1–5, a vehicle seat 1 is designed as a three-part rear-seat bench for a motor vehicle, in particular for a "van" or a minibus. Of the three parts which are arranged next to one another in the direction of travel the left third of the vehicle seat 1 is described in the following. The directional details which are used relate to the conventional direction of travel of the motor vehicle.

The vehicle seat 1 has, in each third, a seat frame having a front foot 3, a rear foot 5, a frame side part 7 and a foot link 9 on each of the two sides, of which the left side is described in the following. In the seat position of the vehicle seat 1, the front foot 3 is latched in place on a front fastening bolt 13 of the vehicle structure, in which case it is preferably re-releasable. The rear foot 5 is latched releasably in place on a rear fastening bolt 15 belonging to the vehicle structure. The frame side part 7 has a triangular basic shape and is coupled to the front foot 3 at the front lower corner by means of a first front bolt 17. At its rear corner, the frame side part 7 is coupled to the rear foot 5 by means of a first rear bolt 19. Furthermore, a cushion carrier 21 is likewise fastened to this first bolt 19. The cushion carrier 21 is also attached to the front upper corner of the frame side part 7 and extends between the two sides of the third of the vehicle seat 1. The cushion carrier 21, for example a plastic seat shell, carries a seat cushion 22. The elongated foot link 9 is coupled at its front end to the front foot 3 by means of a second front bolt 23 and is coupled at its rear end to the rear foot 5 by means of a second rear bolt 25.

On both sides of the third of the vehicle seat 1, a backrest 27 is coupled pivotally to the rear feet 5 by means of a backrest bolt 29. The backrest 27 carries a backrest cushion 30. An elongated backrest link 31 is coupled to the frame side part 7 by a third rear bolt 33 and to the backrest 27 by an upper bolt 35. A gas-filled compression spring 39 is preferably also clamped between the front foot 3 and the rear foot 5 and is arranged approximately parallel to the foot link 9. For the sake of clarity, this gas-filled compression spring 39 is only shown in FIG. 1, where it is illustrated schematically. The rear foot 5 is inclined somewhat rearward from the rear fastening bolt 15. In the event of a crash, the components described are designed in such a manner that the two links 9 and 31 do not have to transmit virtually any crash forces.

In order to enlarge the loading area of the motor vehicle, the vehicle seat 1 can be transformed into a folded position. For this purpose, the user undertakes a single maneuver in order to actuate an operating element by means of which the rear foot 5 is unlatched from the rear fastening bolt 15. The front foot 3, the frame side part 7, the rear foot 5 and the foot link 9 form a first four-bar linkage whose corners are defined by the first front bolt 17, the first rear bolt 19, the second rear bolt 25 and the second front bolt 23 and do not coincide. The unlatching of the rear foot 5 causes the gas-filled compression spring 39 to extend and to push the rear foot 5 rearward at its lower end. If a gas-filled compression spring 39 is not present, the user uses the same maneuver by which he/she unlatches the rear foot 5 to simultaneously pull the rear foot 5 rearward at its lower end. The transmission of force in the first four-bar linkage causes the movement of the rear foot 5 to transfer into a pivoting movement running in the counterclockwise direction in the drawing. At the same time, the rear foot 5 is raised by the first four-bar linkage, with the result that the cushion carrier 21 together with the frame side part 7 is pivoted forward around the first front bolt 17, i.e. likewise in the counterclockwise direction in the drawing.

The rear foot 5, the backrest 27, the backrest link 31 and the frame side part 7 form a second four-bar linkage whose corners are defined by the first rear bolt 19, the backrest bolt 29, the upper bolt 35 and the third rear bolt 33 and do not coincide. The pivoting movement of the rear foot 5 also causes the second four-bar linkage to move which then pivots the backrest 27 rearward relative to the rear foot 5, i.e. in the clockwise direction in the drawing. The pivoting movement of the second four-bar linkage for the most part equalizes the pivoting movement of the first four-bar linkage, with the result that the backrest 27 approximately retains its inclination relative to the vehicle structure. However, the backrest 27 is displaced forward relative to the front foot 3, i.e. in the longitudinal direction of the seat, with the result that on reaching the folded position it is arranged approximately above the front foot 3. On reaching the folded position, the cushion carrier 21 is pivoted forward approximately through 90°, so that it is aligned approximately parallel to the backrest 27 and is arranged behind the latter.

Figure 1:
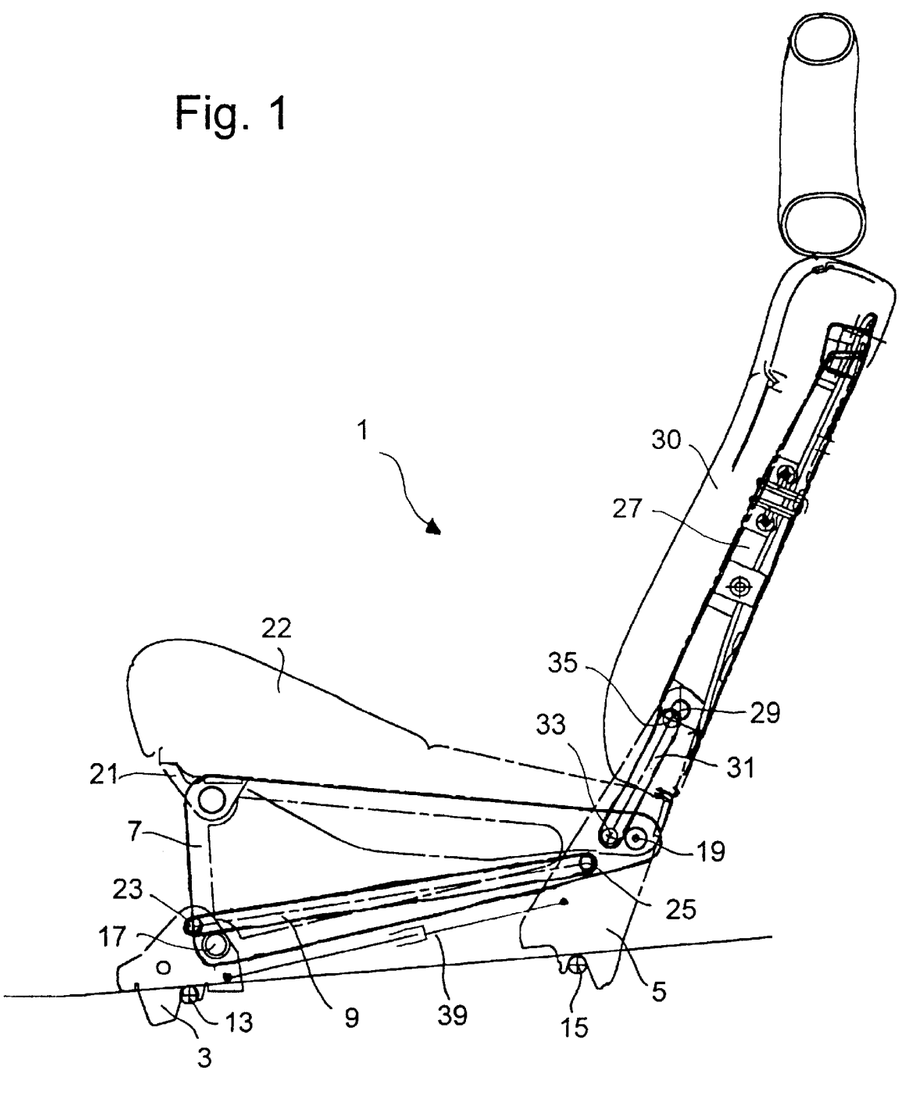
FIG. 1 shows a schematic side view of the first exemplary embodiment in the seat position.
Figure 2:
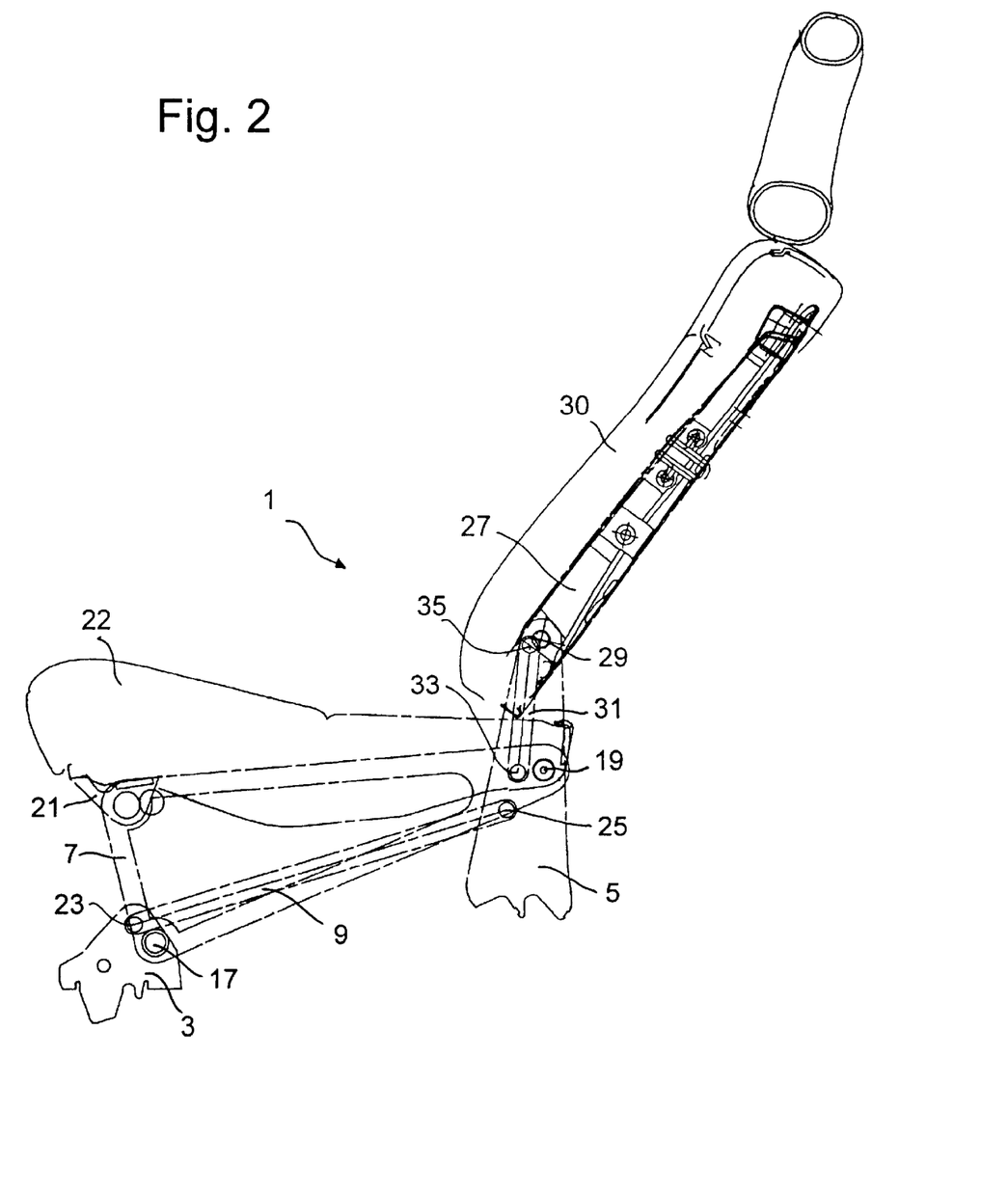
FIG. 2 shows a schematic side view of the first exemplary embodiment in a first intermediate position.
Figure 3:
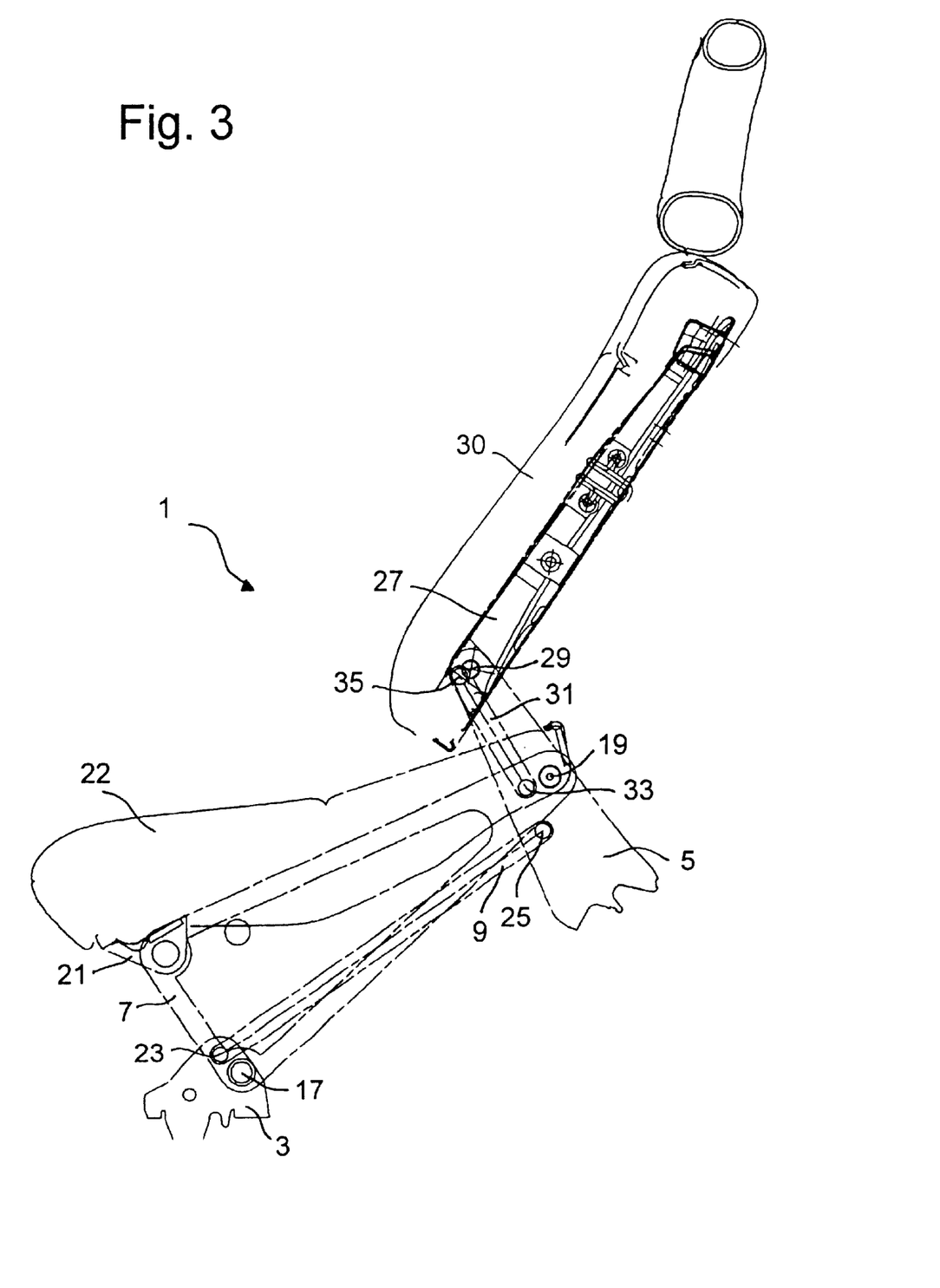
FIG. 3 shows a schematic side view of the first exemplary embodiment in a second intermediate position.
Figure 4:
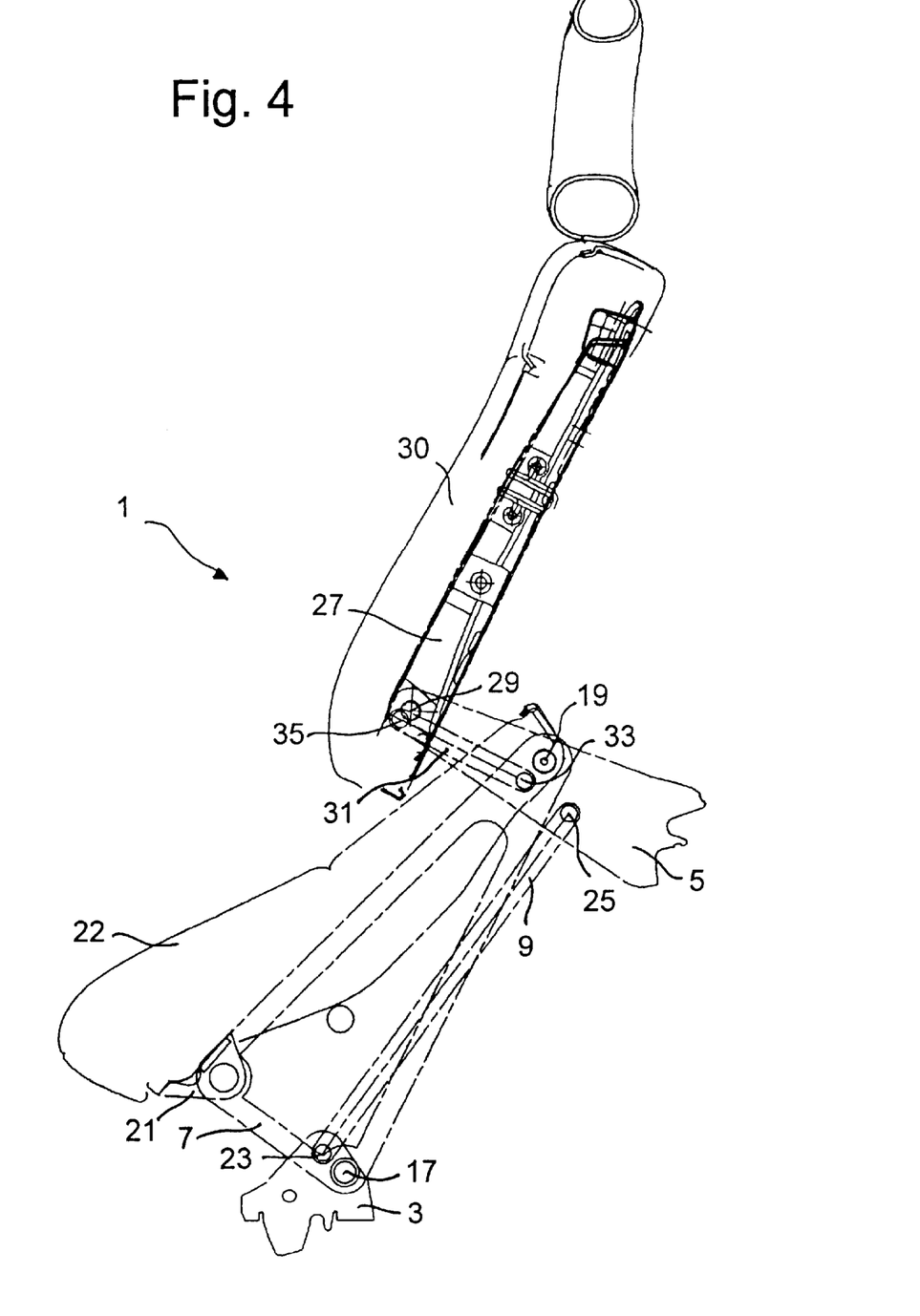
FIG. 4 shows a schematic side view of the first exemplary embodiment in a third intermediate position.
Figure 5:
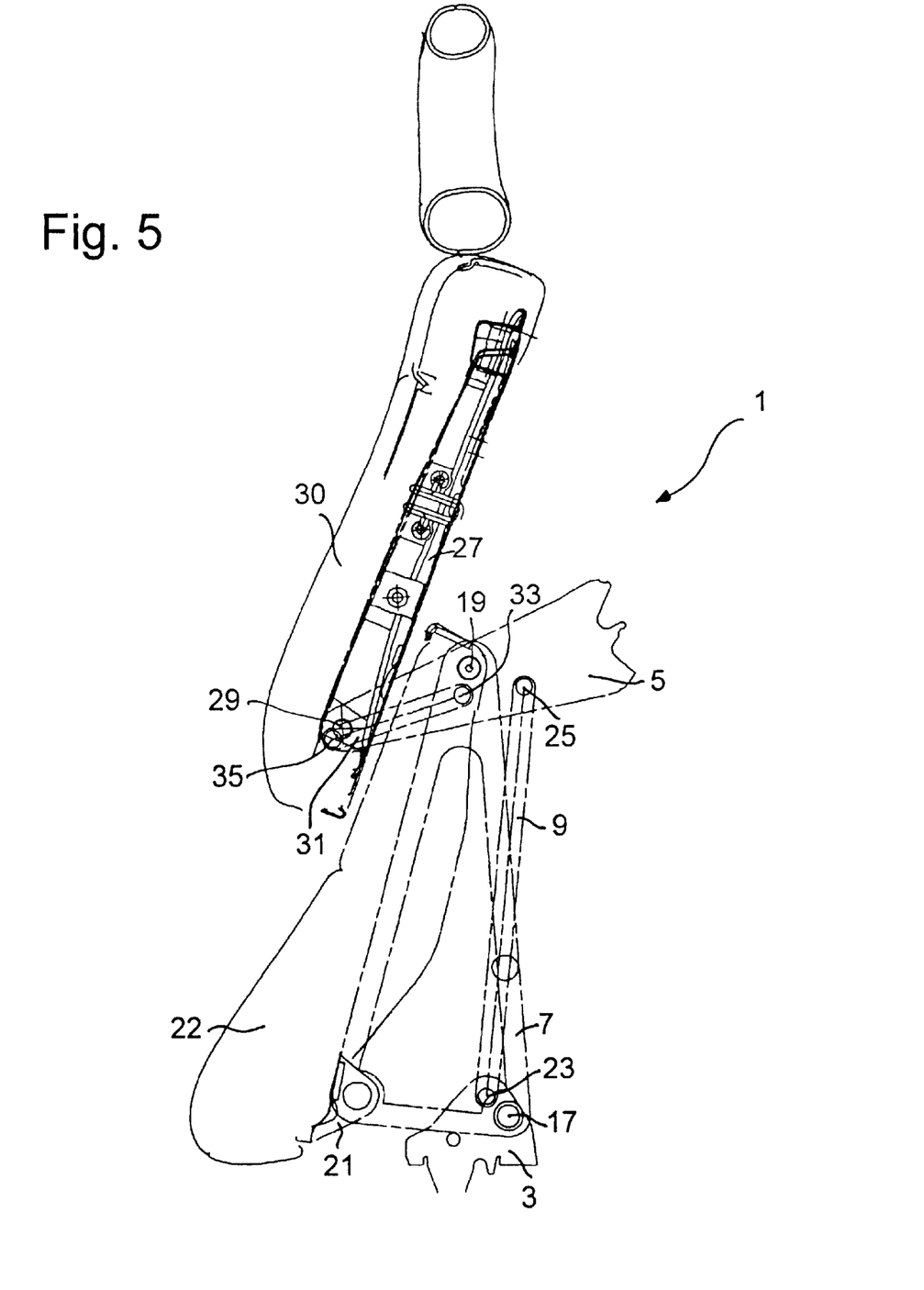
FIG. 5 shows a schematic side view of the first exemplary embodiment in the folded position.
Figure 6:
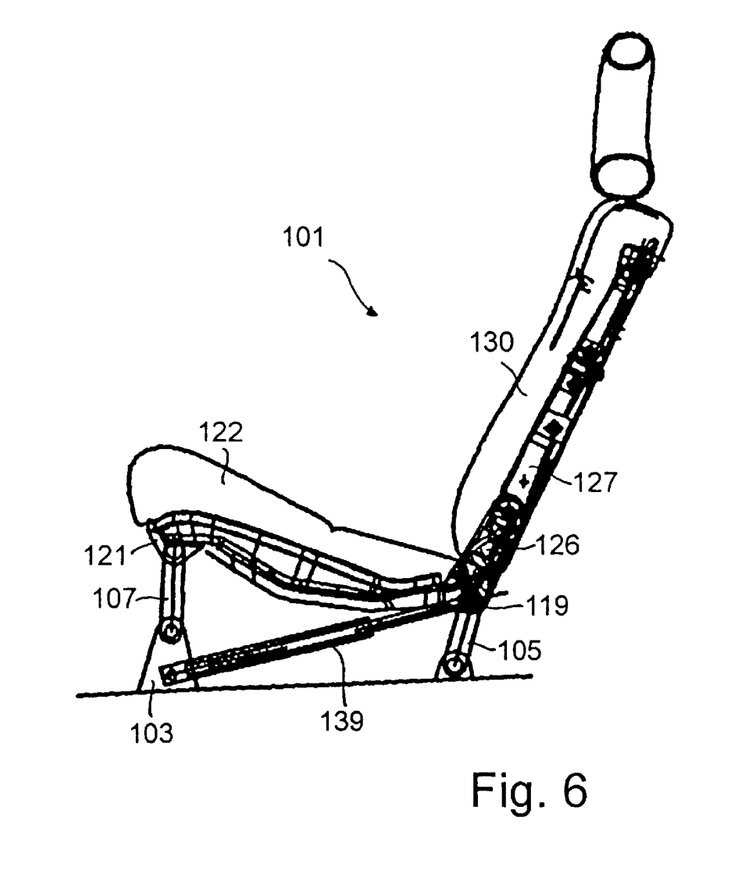
FIG. 6 shows a schematic side view of the second exemplary embodiment in the seat position.
Figure 7:
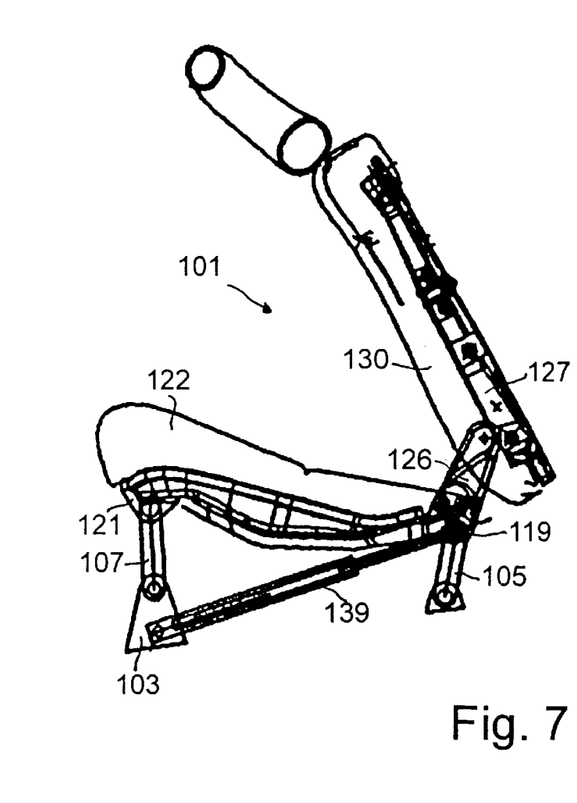
FIG. 7 shows a schematic side view of the second exemplary embodiment in a first intermediate position as the backrest is being folded forward.
Figure 8:
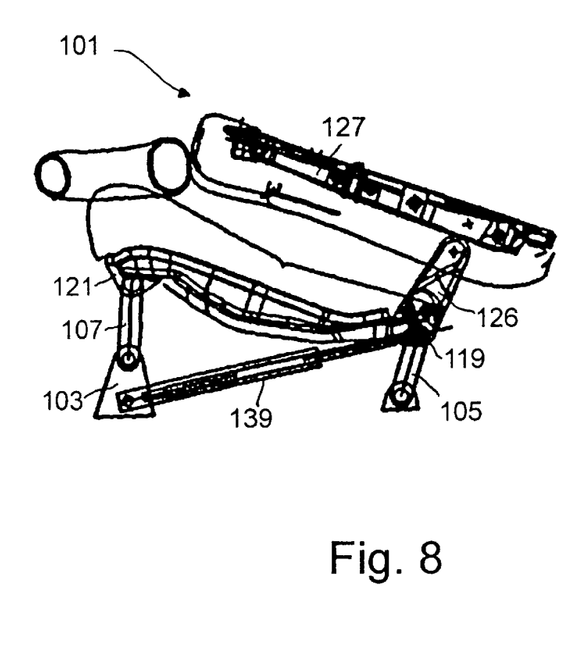
FIG. 8 shows a schematic side view of the second exemplary embodiment in a second intermediate position after the backrest has been folded forward.
Figure 9:
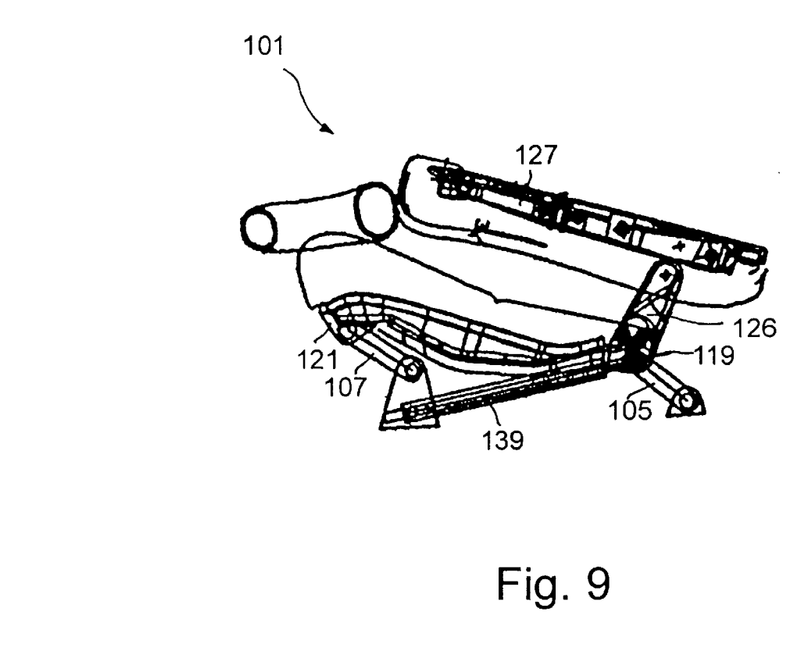
FIG. 9 shows a schematic side view of the second exemplary embodiment in a third intermediate position during folding of the seat.
Figure 10:
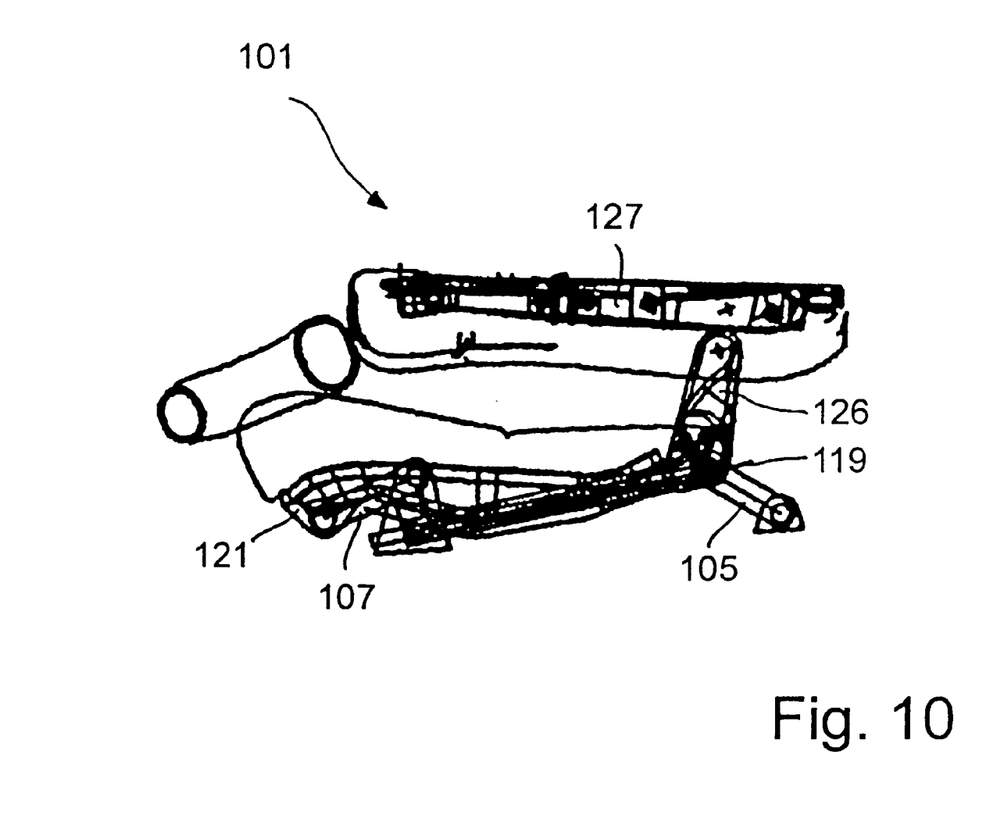
FIG. 10 shows a schematic side view of the second exemplary embodiment in the table position.
Figure 11:
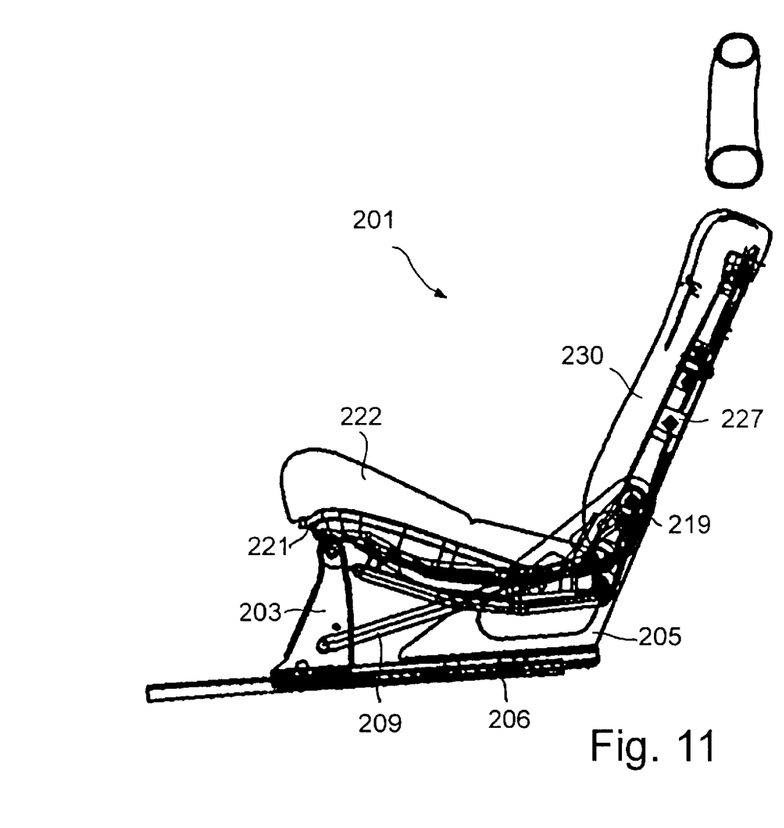
FIG. 11 shows a schematic side view of the third exemplary embodiment in the seat position.

The upwardly folded position, which has thus been achieved by means of a single maneuver and a suitable kinematic arrangement of the components, is secured by suitable securing means, for example by the gas-filled compression spring 39. If the need arises, the entire vehicle seat 1 can be removed from the motor vehicle by unlatching the front foot 3. The return into the seat position takes place correspondingly in reverse sequence by the rear foot 5 being pressed downward, which triggers a pivoting movement rearward, i.e. in the clockwise direction in the drawing. If a gas-filled compression spring 39 is present, the vehicle seat 1 has to be pivoted back counter to the force thereof. The seat position is achieved when the rear foot 5 is automatically latched in place on the rear fastening bolt 15.

In so far as the following exemplary embodiments have identical components or identically acting components to the first exemplary embodiment, in the following description reference numbers incremented by 100 in each case are used for these components.

In a second exemplary embodiment illustrated in FIGS. 6–10, a vehicle seat 101, which is designed as a three-part rear-seat bench for a motor vehicle, is first of all described in an in-use or seat position. In the vehicle seat 101, on both sides of each third, as part of the seat frame, a front foot 103 is fastened at the front and a rear rocker 105 is coupled at the rear at its lower end to the vehicle structure. A front rocker 107 is coupled by its lower end to the front foot 103. The respectively upper end of the two rockers 105 and 107 is coupled to a cushion carrier 121 which carries a seat cushion 122. A backrest 127, which carries a backrest cushion 130, is coupled to the rear end of the cushion carrier 121 via a connecting part 126. A gas-filled compression spring 139 is coupled to the front foot 103 and to the cushion carrier 121 in its rear region, for example at the coupling point for the rear rocker 105. The rear rocker 105, the cushion carrier 121 and the front rocker 107, together with the vehicle structure, form a four-bar linkage which can also be used as a height adjuster.

For the transformation into a non-use folded position (table position) having an enlarged loading area (approximately 84%), a first maneuver is used to fold the backrest 127 forward, with the result that the backrest cushion 130 comes to bear against the seat cushion 122. A second maneuver is then used to fold the vehicle seat 101, i.e. the four-bar linkage is folded forward. In the process, the front rocker 107 comes to lie virtually horizontally, with the result that the cushion carrier 121 is inclined slightly forward. In this table position, the rear side of the backrest 127 forms an approximately horizontal loading area. For the return into the seat position, the described steps are carried out in reverse sequence.

In a third exemplary embodiment illustrated in FIGS. 11–14, a vehicle seat 201, which is likewise designed as a three-part rear-seat bench for a motor vehicle, is first of all described in the seat position. In each third of the vehicle seat 201, a front foot 203, which is latched in place releasably on the vehicle structure, and a rear foot 205, which can be displaced relative to the vehicle structure by means of a runner 206, are provided on both sides as part of the seat frame. A link 209 is coupled by one end to the front foot 203 and by its other end to the rear foot 205. The respectively upper end of the two feet 203 and 205 is coupled to a cushion carrier 221 which carries a seat cushion 222. The coupling point of the rear foot 205 on the cushion carrier 221 is denoted by 219. Also coupled to the coupling point 219 is a backrest 227 which carries a backrest cushion 230. The rear foot 205, the cushion carrier 221, the front foot 203 and the link 209 form a four-bar linkage whose corners do not coincide.

Figure 12:
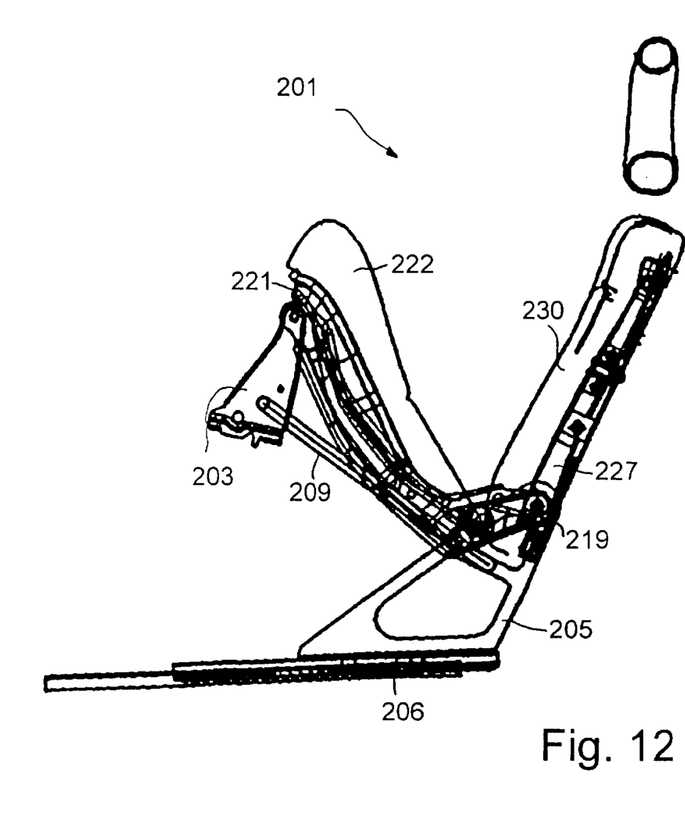
FIG. 12 shows a schematic side view of the third exemplary embodiment in a first intermediate position as the cushion carrier is being folded upward.
Figure 13:
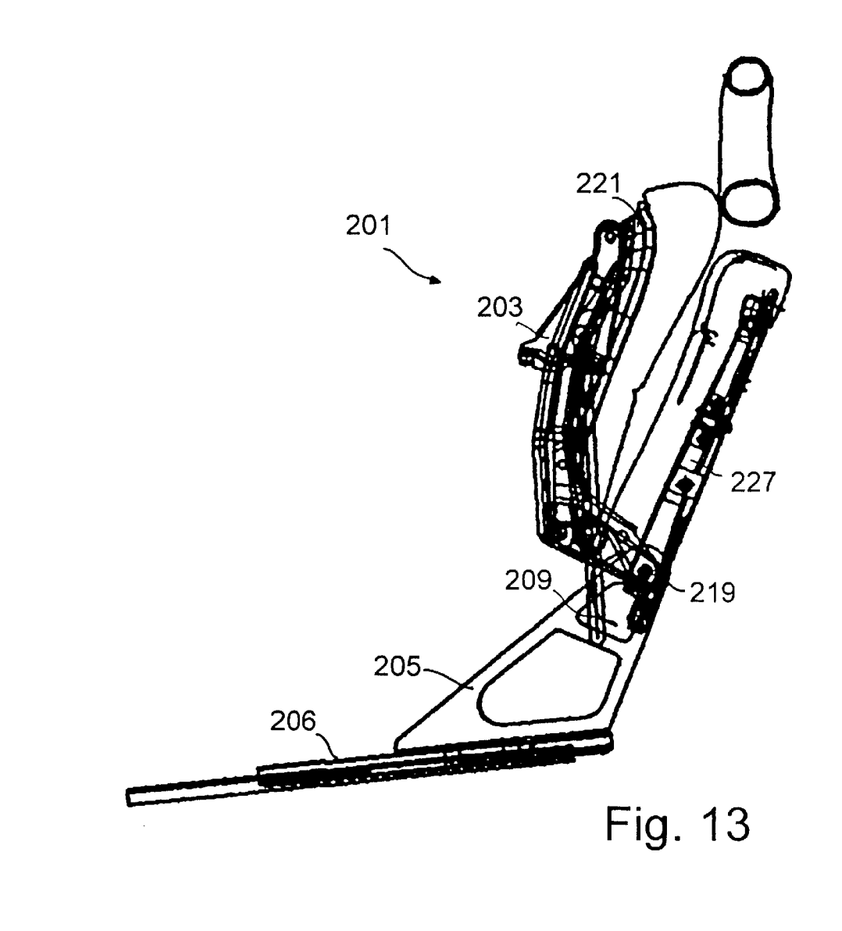
FIG. 13 shows a schematic side view of the third exemplary embodiment in a second intermediate position after the cushion carrier has been folded upward.
Figure 14:
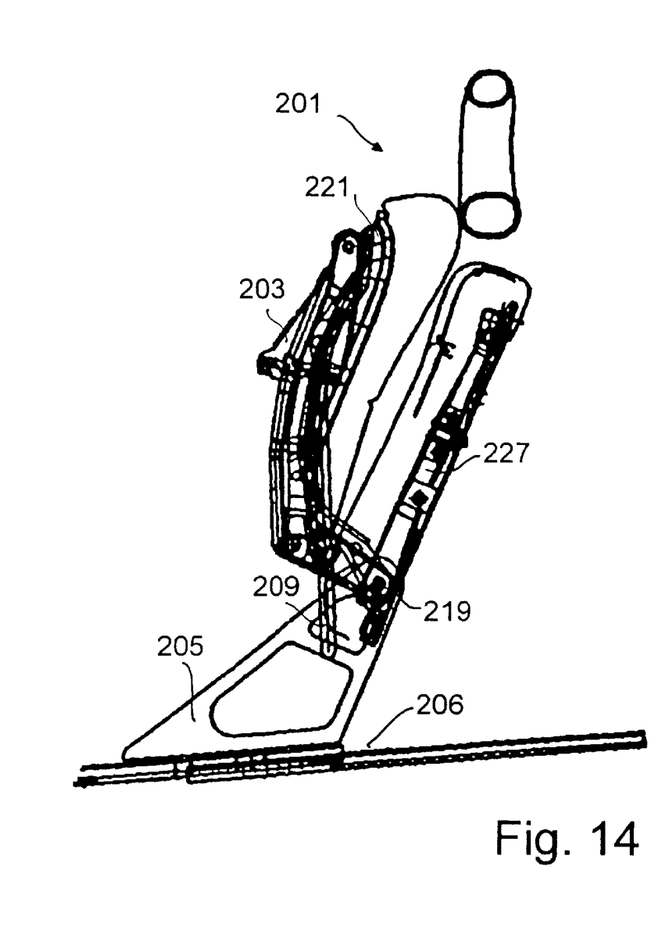
FIG. 14 shows a schematic side view of the third exemplary embodiment which has been slid forward and is in the folded position.
Figure 15:
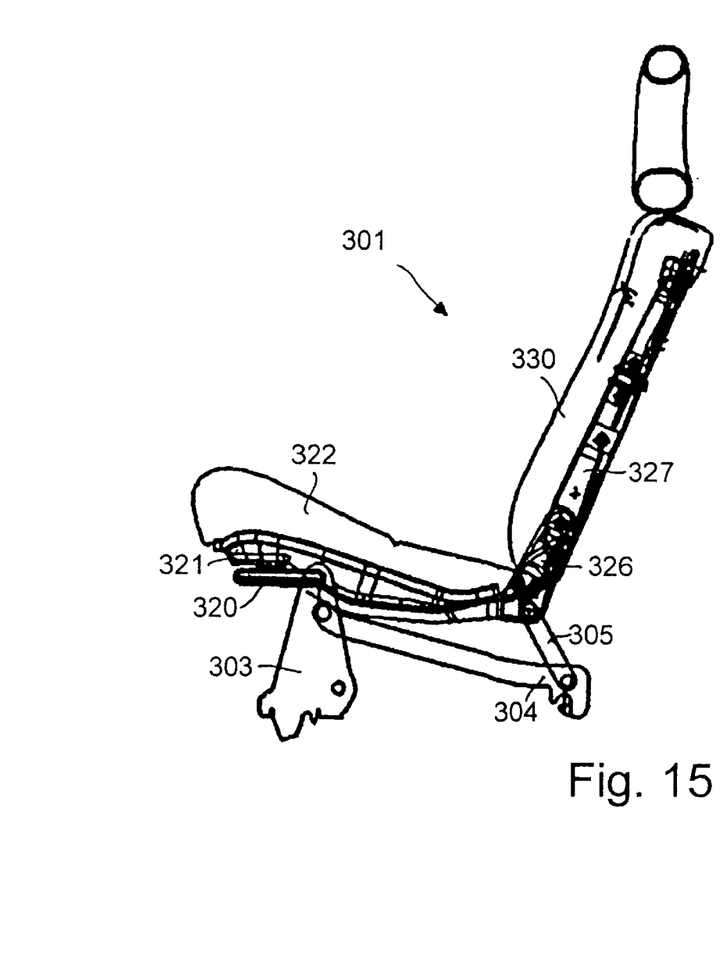
FIG. 15 shows a schematic side view of the fourth exemplary embodiment in the front-most seat position.
Figure 16:
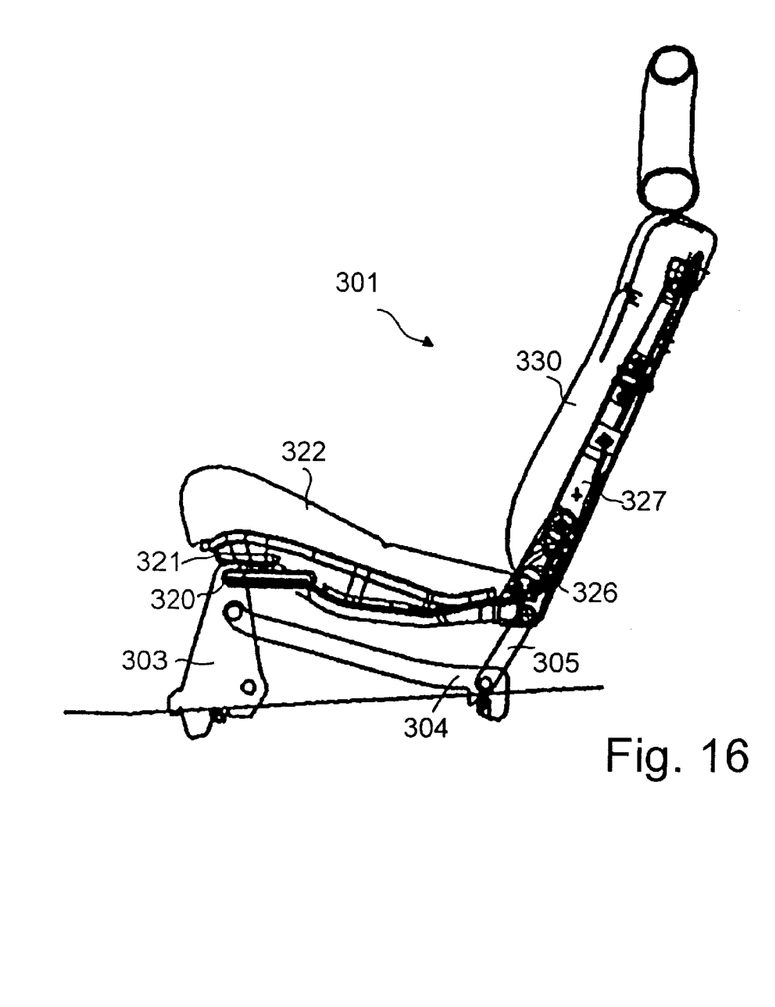
FIG. 16 shows a schematic side view of the fourth exemplary embodiment in the rear-most seat position.
Figure 17:
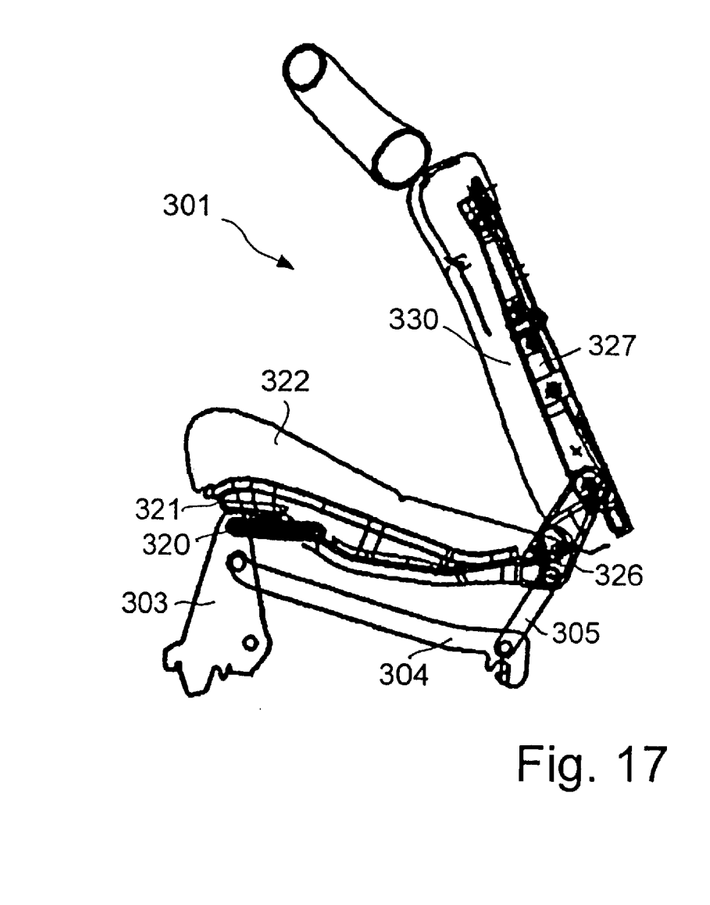
FIG. 17 shows a schematic side view of the fourth exemplary embodiment in a first intermediate position as the backrest is being folded forward.
Figure 18:
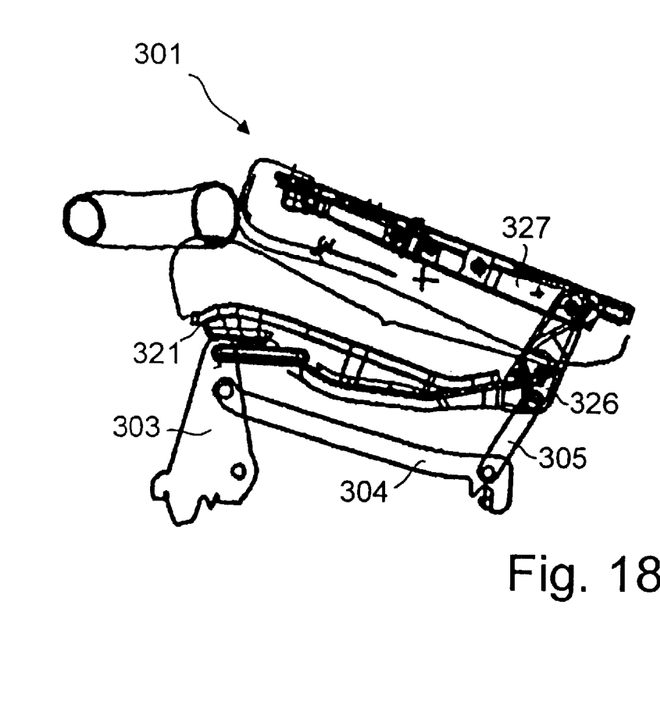
FIG. 18 shows a schematic side view of the fourth exemplary embodiment in a second intermediate position after the backrest has been folded forward.
Figure 19:
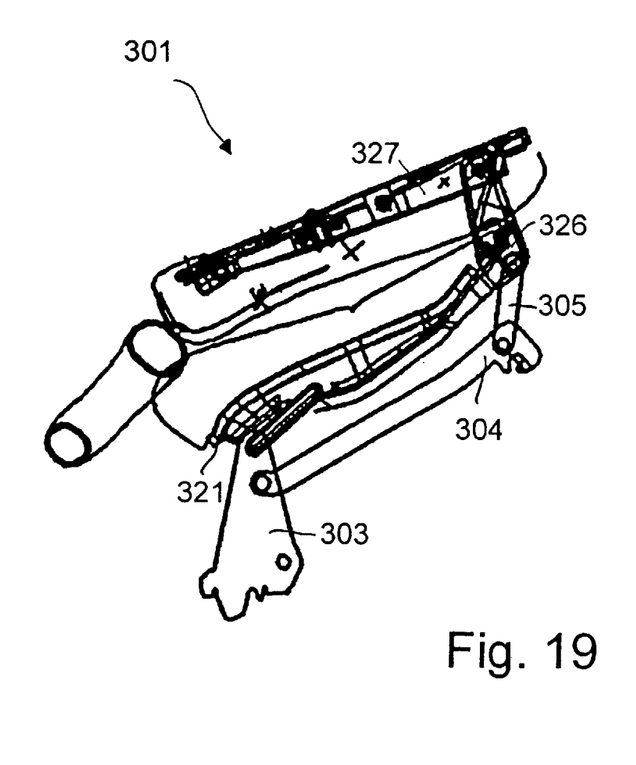
FIG. 19 shows a schematic side view of the fourth exemplary embodiment in a third intermediate position as the seat is being folded upward.
Figure 20:
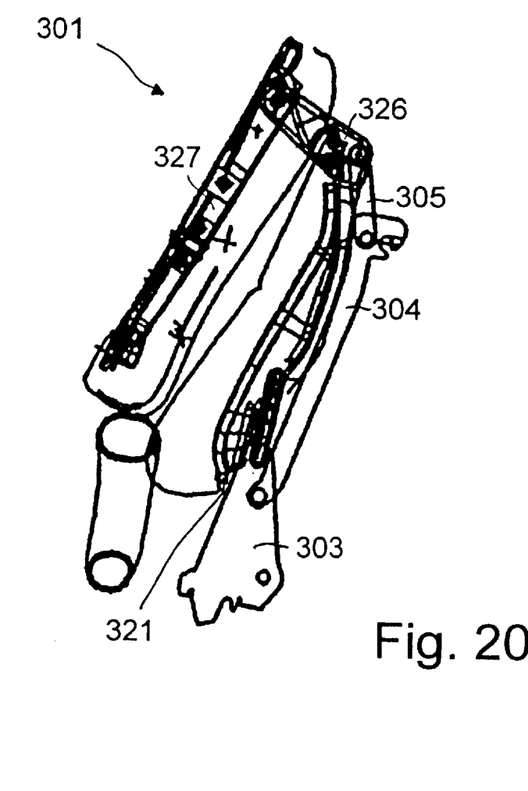
FIG. 20 shows a schematic side view of the fourth exemplary embodiment in the folded position.

To transform the vehicle seat 201 into the folded position with an enlarged loading area, a first maneuver is used to unlatch and raise the front foot 203, so that the cushion carrier 221 is folded upward together with the seat cushion 222. Via the link 209, the four-bar linkage is moved in such a manner that the front foot 203 is placed tightly and in a space-saving manner against the cushion carrier 221. A gas-filled compression spring may be provided in order to assist the movement. After the seat cushion 222 has come to bear against the backrest cushion 230 and is situated above the rear foot 205, a second maneuver is used to slide the vehicle seat 201 forward as a whole, i.e. the rear foot 205 is slid forward as far as possible relative to the vehicle structure by means of the runner 206, until the folded position is reached in the end position. The runner 206 is used at the same time as a longitudinal adjuster, so that the longitudinal position of the vehicle seat 201 can also be adjusted by the described displacement. The locking in the folded position takes place via the runner 206 and by it resting against a front seat. A separate locking arrangement for the cushion carrier 221 is unnecessary. If appropriate, however, a pull strap or the above-mentioned gas-filled compression spring is provided as securing means. For the return into the seat position, the steps which have been described are carried out in reverse sequence.

In a fourth exemplary embodiment illustrated in FIGS. 15–20, a vehicle seat 301, which again is designed as a three-part rear-seat bench for a motor vehicle, is first of all described in the seat position. In each third of the vehicle seat 301, a front foot 303 and a rear foot 304 are releasably latched in place on the vehicle structure on both sides as part of the seat frame. The rear foot 304 is coupled via an elongated coupling section, which is integrally formed with it, to the front foot 303. A rear rocker 305 is coupled by its lower end to the rear foot 304. The front foot 303 is fitted into a guide 320, for example a slot/pin guide, an elongated hole/pin guide or a runner, on the front end of a cushion carrier 321 which carries a seat cushion 322. The rear rocker 305 is coupled by its upper end to the rear end of the cushion carrier 321. The cushion carrier 321 is provided at its rear end with a connecting part 326 to which a backrest 227, which carries a backrest cushion 330, is coupled. The front foot 303, the rear foot 304 together with its coupling section, the rear rocker 305 and the cushion carrier 321 can form a four-bar linkage as a function of the acting forces. The guide 320 and the rear rocker 305, which is moveable relative to the rear foot 304, form a longitudinal adjuster by means of which the cushion carrier 321 can be displaced in the longitudinal direction (by 110 mm).

For the transformation into the folded position having an enlarged loading area (80%), a first maneuver is used to fold the backrest 327 forward and, in the process, to slide the cushion carrier 321 into its rearmost position. As soon as the backrest cushion 330 bears against the seat cushion 322, a second maneuver is used to unlatch the rear foot 304 and fold the rear of the vehicle seat 301 upward until the rear foot 304 comes to bear with its coupling section against the cushion carrier 321. The cushion carrier 321 is then arranged above the front foot 303. If the need arises, the entire vehicle seat 301 can be removed from the motor vehicle by unlatching the front foot 303. For the return into the seat position, the described steps are carried out in reverse sequence.

That which is claimed:

1. A vehicle seat that can be transformed in order to enlarge an area that is for being loaded, the vehicle seat comprising:

an articulated seat frame including a cushion carrier and a first four-bar linkage, with the cushion carrier carrying a seat cushion; and a backrest including a backrest cushion, wherein the backrest is coupled to the seat frame by way of a second four-bar linkage so that the vehicle seat can be transformed from at least one seat position to at least one folded position, there is relative movement between parts of the seat frame while the vehicle seat is transformed from the seat position to the folded position, there is relative movement between the backrest and the cushion carrier while the vehicle seat is transformed from the seat position to the folded position, and moving of a single part of the vehicle seat causes both movement of the seat frame and relative movement between the backrest and the cushion carrier.

2. A vehicle seat according to claim 1, wherein said single part is part of both of the four-bar linkages.

3. A vehicle seat according to claim 2, wherein said single part is a rear foot of the vehicle seat.

4. A vehicle seat according to claim 1, wherein the second four-bar linkage and the first four-bar linkage are constructed so that a pivoting movement of the second four-bar linkage and a pivoting movement of the first four-bar linkage occur while the vehicle seat is transformed from the seat position to the folded position, with the pivoting movement of the second four-bar linkage substantially equalizing the pivoting movement of the first four-bar linkage.

5. A vehicle seat according to claim 4, wherein the seat frame includes a front and a rear, a longitudinal direction extends from the front to the rear while the vehicle seat is in the seat position, the equalizing of the pivoting movements of the first and second four-bar linkages causes the backrest to be displaced in the longitudinal direction while the vehicle seat is transformed from the seat position to the folded position.

6. A vehicle seat according to claim 1, wherein the backrest includes front and rear sides, with the front side of the backrest facing the backrest cushion and the rear side of the backrest facing away from the backrest cushion, and wherein the rear side of the backrest bears against the seat cushion while the vehicle seat is in the folded position.

7. A vehicle seat according to claim 1, further comprising a gas-filled compression spring connected to said single part for at least partially causing said moving of said single part of the vehicle seat.

8. A vehicle seat according to claim 7, wherein the gas-filled compression spring is for moving said single part of the vehicle seat in a manner that causes the vehicle seat to be transformed from the seat position to the folded position.

9. A vehicle seat according to claim 1, wherein:
the movement of the seat frame that is caused by said moving of said single part is the relative movement between the parts of the seat frame that occurs while the vehicle seat is transformed from the seat position to the folded position, and
the relative movement between the backrest and the cushion carrier that is caused by said moving of said single part is the relative movement between the backrest and the cushion carrier that occurs while the vehicle seat is transformed from the seat position to the folded position,
whereby the moving of said single part causes the vehicle seat to be transformed from the seat position to the folded position.

10. A vehicle seat according to claim 3, wherein:
the movement of the seat frame that is caused by said moving of said single part is the relative movement between the parts of the seat frame that occurs while the vehicle seat is transformed from the seat position to the folded position, and
the relative movement between the backrest and the cushion carrier that is caused by said moving of said single part is the relative movement between the backrest and the cushion carrier that occurs while the vehicle seat is transformed from the seat position to the folded position,
whereby the moving of said single part causes the vehicle seat to be transformed from the seat position to the folded position.

11. A vehicle seat according to claim 2, wherein the second four-bar linkage and the first four-bar linkage are constructed so that a pivoting movement of the second four-bar linkage and a pivoting movement of the first four-bar linkage occurs while the vehicle seat is transformed from the seat position to the folded position, with the pivoting movement of the second four-bar linkage substantially equalizing the pivoting movement of the first four-bar linkage, and wherein the seat frame includes a front and a rear, a longitudinal direction extends from the front to the rear while the vehicle seat is in the seat position, and the equalizing of the pivoting movements of the first and second four-bar linkages causes the backrest to be displaced in the longitudinal direction while the vehicle seat is transformed from the seat position to the folded position.

12. A vehicle seat according to claim 11, wherein the backrest includes front and rear sides, with the front side of the backrest facing the backrest cushion and the rear side of the backrest facing away from the backrest cushion, and wherein the rear side of the backrest bears against the seat cushion while the vehicle seat is in the folded position.

13. A vehicle seat according to claim 3, wherein the second four-bar linkage and the first four-bar linkage are constructed so that a pivoting movement of the second four-bar linkage and a pivoting movement of the first four-bar linkage occur while the vehicle seat is transformed from the seat position to the folded position, with the pivoting movement of the second four-bar linkage substantially equalizing the pivoting movement of the first four-bar linkage.

14. A vehicle seat according to claim 13, wherein the seat frame includes a front and a rear, a longitudinal direction extends from the front to the rear while the vehicle seat is in the seat position, and the equalizing of the pivoting movements of the first and second four-bar linkages causes the backrest to be displaced in the longitudinal direction while the vehicle seat is transformed from the seat position to the folded position.

15. A vehicle seat according to claim 14, wherein the backrest includes front and rear sides, with the front side of the backrest facing the backrest cushion and the rear side of the backrest facing away from the backrest cushion, and wherein the rear side of the backrest bears against the seat cushion while the vehicle seat is in the folded position.

16. A vehicle seat according to claim 15, further comprising a gas-filled compression spring connected to said single part for at least partially causing said moving of said single part of the vehicle seat.

17. A vehicle seat according to claim 16, wherein the gas-filled compression spring is for moving said single part of the vehicle seat in a manner that causes the vehicle seat to be transformed from the seat position to the folded position.

18. A vehicle seat that can be transformed in order to enlarge an area that is for being loaded, the vehicle seat comprising:
an articulated seat frame including a cushion carrier and an adjuster, with the cushion carrier carrying a seat cushion, and the adjuster being operative for moving the cushion carrier between positions, wherein the adjuster is selected from a group consisting of:
a height adjuster for moving the cushion carrier between heights, and
a longitudinal adjuster, wherein the seat frame includes a front and a rear, a longitudinal direction extends from the front to the rear, and the longitudinal adjuster is for moving the cushion carrier in the longitudinal direction; and
a backrest including a backrest cushion, wherein the backrest is coupled to the seat frame in a manner so that the vehicle seat can be transformed from at least one seat position to at least one folded position, wherein there is relative movement between parts of the seat frame while the vehicle seat is transformed from the seat position to the folded position, there is relative movement between the backrest and the cushion carrier while the vehicle seat is transformed from the seat position to the folded position, and the adjuster moves the cushion carrier between the positions while the seat is transformed from the seat position to the folded position.

19. A vehicle seat according to claim 18, wherein the cushion carrier folds upward to the backrest before the adjuster moves the cushion carrier.

20. A vehicle seat according to claim 18, wherein the articulated seat frame further includes a first four-bar linkage and wherein a second four-bar linkage couples the backrest to the seat frame such that the vehicle seat may be transformed from the at least one seated position to the at least one folded position.

21. A vehicle seat according to claim 19, wherein the articulated seat frame further includes a first four-bar linkage and wherein a second four-bar linkage couples the backrest to the seat frame such that the vehicle seat may be transformed from the at least one seated position to the at least one folded position.

* * * * *

UNITED STATES PATENT AND TRADEMARK OFFICE
CERTIFICATE OF CORRECTION

PATENT NO. : 6,595,588 B2
DATED : July 22, 2003
INVENTOR(S) : Ellerich et al.

It is certified that error appears in the above-identified patent and that said Letters Patent is hereby corrected as shown below:

Title page,
Item [56], References Cited, insert the following:
-- OTHER PUBLICATIONS
Application No. 10,127,269; filed April 22, 2002; Entitled: *Vehicle Seat Having a Folded Position*; Inventor: Kammerer --.

Signed and Sealed this

Eleventh Day of November, 2003

JAMES E. ROGAN
*Director of the United States Patent and Trademark Office*